(12) United States Patent
Saylor, Jr.

(10) Patent No.: US 8,210,303 B2
(45) Date of Patent: Jul. 3, 2012

(54) TRACTION ROBOT

(76) Inventor: Edward T. Saylor, Jr., Vero Beach, FL (US)

( * ) Notice: Subject to any disclaimer, the term of this patent is extended or adjusted under 35 U.S.C. 154(b) by 0 days.

(21) Appl. No.: 12/846,505

(22) Filed: Jul. 29, 2010

(65) Prior Publication Data
US 2011/0024215 A1  Feb. 3, 2011

Related U.S. Application Data

(60) Provisional application No. 61/229,704, filed on Jul. 29, 2009.

(51) Int. Cl.
 *B62D 55/07* (2006.01)
 *B62D 55/265* (2006.01)
(52) U.S. Cl. .......................................... 180/164

(58) Field of Classification Search ............ 180/164
See application file for complete search history.

(56) References Cited

U.S. PATENT DOCUMENTS

| | | | | |
|---|---|---|---|---|
| 4,664,212 A * | 5/1987 | Nagatsuka et al. | ........... | 180/164 |
| 5,366,038 A * | 11/1994 | Hidetsugu et al. | ........... | 180/164 |
| 5,487,440 A * | 1/1996 | Seemann | ........... | 180/164 |
| 6,090,221 A * | 7/2000 | Gan et al. | ........... | 134/21 |
| 6,099,091 A * | 8/2000 | Campbell | ........... | 305/4 |

* cited by examiner

*Primary Examiner* — Kevin Hurley
(74) *Attorney, Agent, or Firm* — Mattingly & Malur, PC

(57) ABSTRACT

A traction unit has carrier sections on which suction cups are mounted that are connected to a vacuum source. The carrier units are driven around the frame by a chain driven by a motor. The frame has sections which move relative to one another in order to permit turning control of the traction unit.

6 Claims, 10 Drawing Sheets

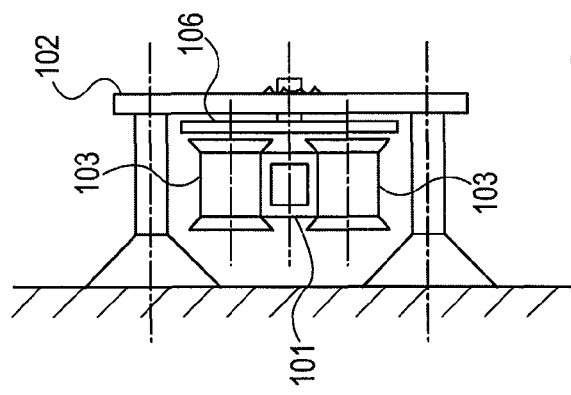
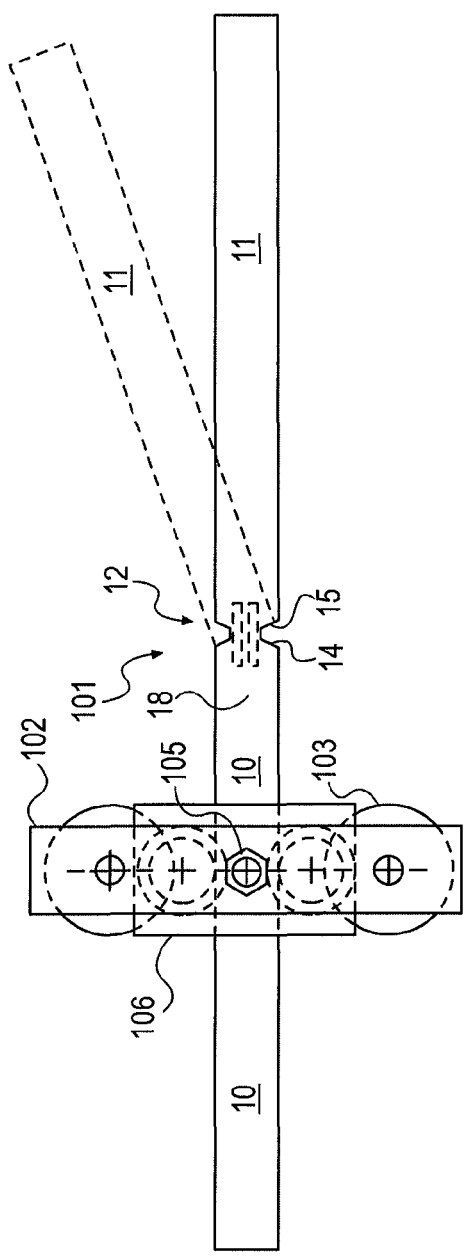

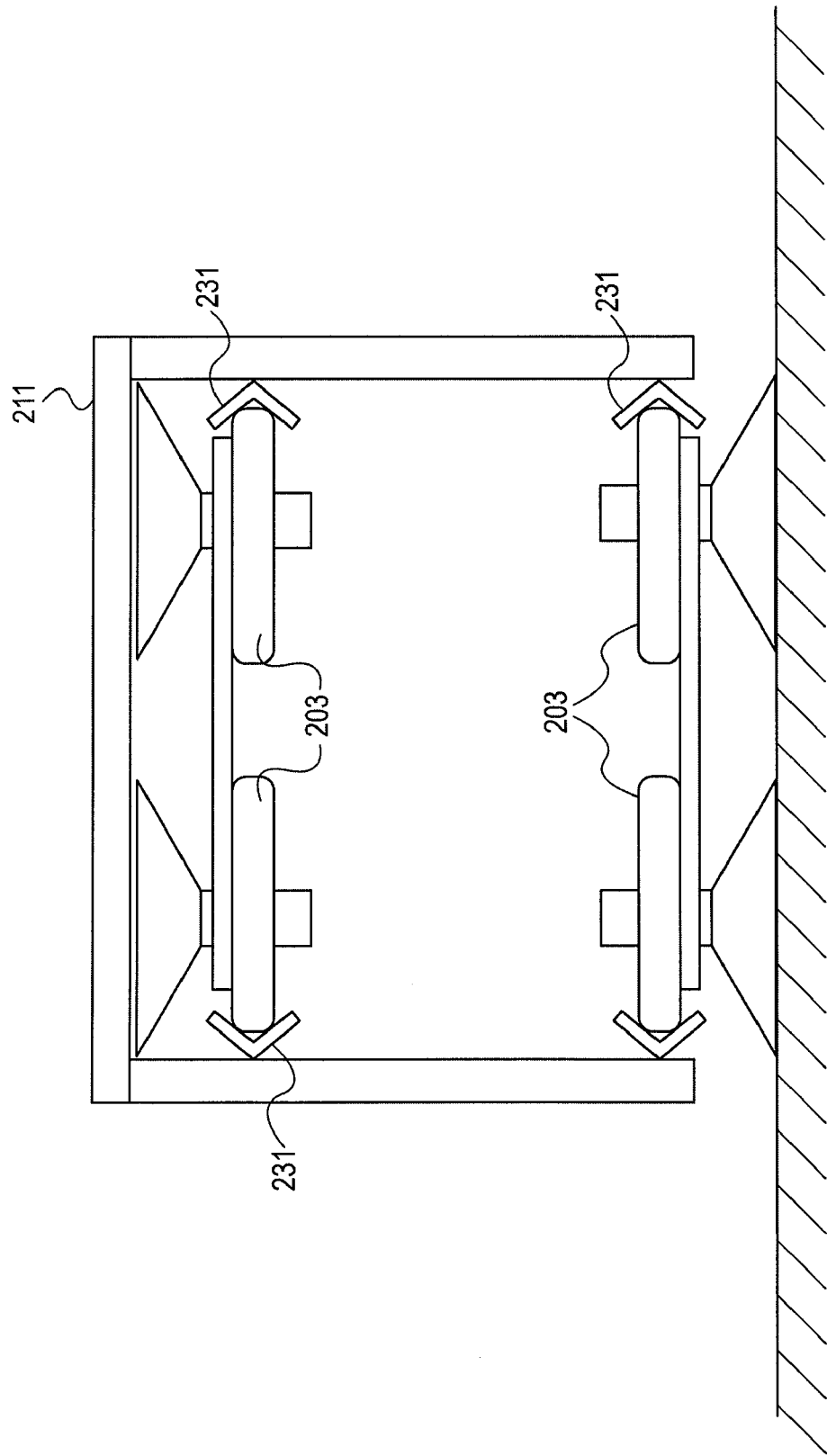

TRACTION ROBOT

CROSS REFERENCES TO RELATED APPLICATIONS

This application claims the benefit of U.S. Provisional Application No. 61/229,704, filed Jul. 29, 2009 to the same inventor as herein, the entire disclosure of which is incorporated herein by reference.

BACKGROUND OF THE INVENTION

1. Field of the Invention

The present invention relates to a remote control device or self controlled robotic device used for traversing an apparatus for working on a surface while adhering to the surface through suctions cups.

2. Description of Related Art

Remote controlled devices and robots are used in remote, hazardous or difficult to reach areas in which operations are performed. The traction device for such robots and remote control devices enables climbing a vertical wall or traversing a ceiling. Such devices are useful in non-destructive testing and of interest in the aircraft industry, in particular.

U.S. Pat. No. 7,404,464 to Imus et al discloses a traction device having a continuous traction belt provided on a pair of opposing rollers in which the traction belt includes openings such that a vacuum may be applied through the traction belt enabling the apparatus to cling to a working surface.

U.S. Pat. No. 6,742,617 discloses a traction unit that is able to traverse compound curves and surfaces having suction cups that enable the apparatus to adhere and release from the surface as the traction unit moves across a surface.

SUMMARY OF THE INVENTION

According to embodiments of the present invention, a traction device has suction cups that enable the device to adhere to the surface on which it traverses.

According to embodiments of the invention, the suction cups are supported by carriers that traverse a frame and suction applied to the cups enable the cups to engage the surface to provide the resulting adhesion.

According to embodiments of the invention, the frame on which suction cups are supported and move around is articulated and can be adjusted to change direction of the traction device as the traction device moves across the surface to which the suction cups adhere.

According to embodiments of the invention, a traction unit is capable of traversing a surface at a controlled rate and turning by remote control on surfaces that include compound curves, vertical walls and ceilings. By mounting a working apparatus that performs sanding, buffing, paint removal, drilling or non-destructive testing equipment, the work surface can be traversed by the traction unit and work accomplished by remote control or robotically.

According to embodiments of the invention, the frame for holding the suction cups is comprised of sections flexibly connected to one another to enable the sections of the traction unit to move with respect to one another for traversing a work surface in a straight line or at angles thereto in order to make turns in accordance with adjustments made between adjacent sections in the connection angle between therebetween for ensuring versatile movement of the traction unit in different directions along its path of travel.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 2 is a top view of one part of a traction unit as shown in FIG. 1.

FIG. 3 is a side view of the carrier shown in FIG. 2 according to the embodiment of the invention shown in FIG. 1.

FIG. 13 shows a schematic side view of a section of the support frame of the traction unit shown in FIG. 11.

DETAILED DESCRIPTION OF THE INVENTION

Figure 1:
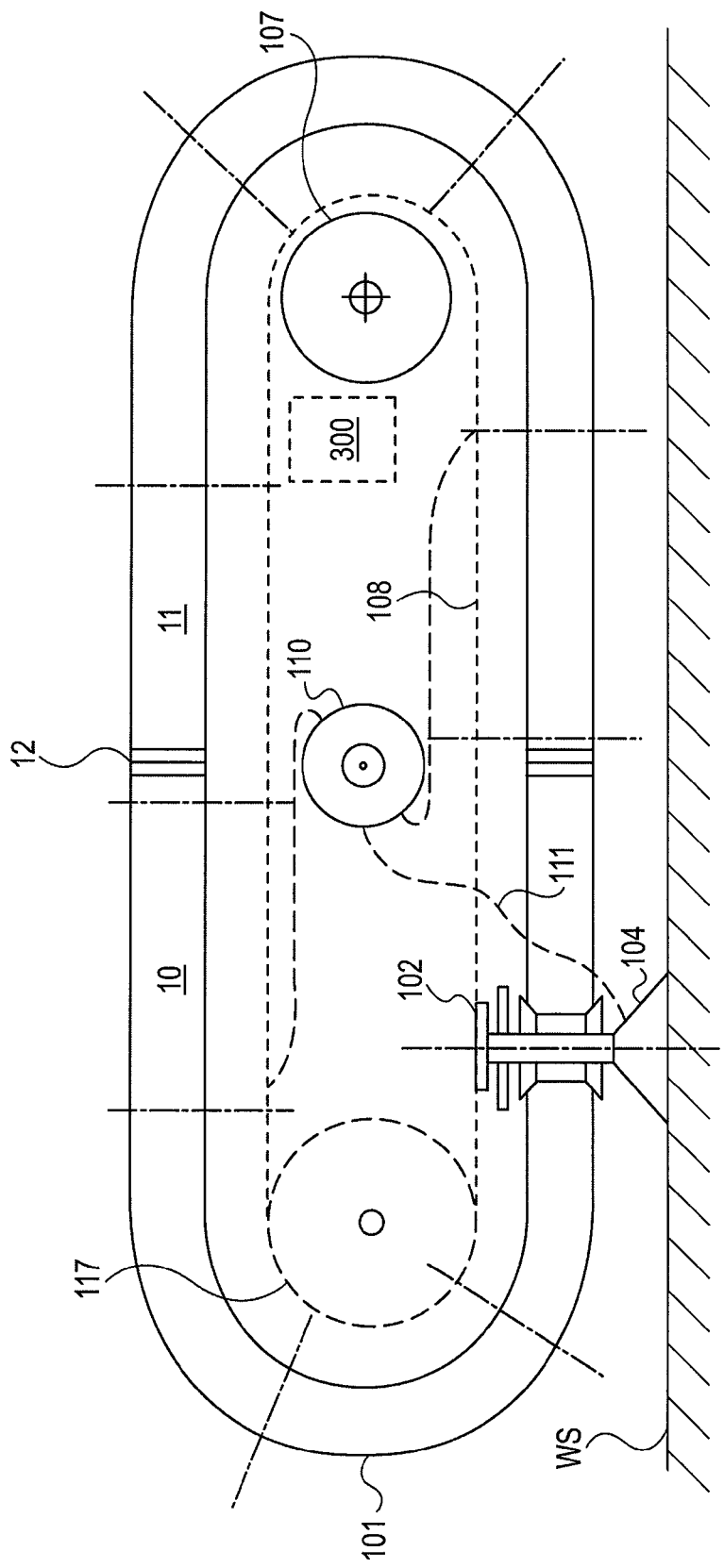
FIG. 1 is a side view of a traction unit according to a first embodiment of the invention shown schematically.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

A traction unit according to one embodiment of the invention as shown schematically in side view in FIG. 1. The traction unit has a frame 101 of a shape, such as an oval shape, as shown in the figure. The frame is preferably of tubular construction having a rectangular cross-sectional shape as shown in FIG. 3, for example. A plurality of carriers 102, only one of which is shown for brevity, are mounted to move around the frame 101 and are spaced equidistantly around the frame as indicated schematically. The carriers 102 are, as shown in FIG. 3, provided with rollers 103 that engage frame 101 to move along frame 101. A chain 108 (shown schematically) is driven by a motor 107 at one end of the traction unit and supported by a sprocket 117 at the other end of the traction unit. The carrier 102 has a mounting connection to the chain 108 of a conventional type which enables the carrier 102 to be driven around the frame 101.

As shown in FIG. 1 the traction unit has a control unit 300 onboard, for example on the work platform or mounted internally, optionally with a microprocessor and with communication capability to a remote control to enable control of the traction unit by manipulating the speed of motor 107 and positioning of hydraulic actuators 18 to which the control unit is connected. Alternatively, control unit 300 has a program for commanding control of motor 107 and actuators 18 to traverse a programmed path. Feedback with respect to image or position and orientation (through accelerometers, a GPS system or localized position control system, for example) can also be used for input parameters to the control unit to ensure movement along the desired path.

Each carrier 102 has guide suction cups 104 that engage a work surface WS and are connected to a vacuum source 110 through a vacuum hose 111 (shown schematically) with the understanding that each of the carriers has a shared or separate suction hose connected to the suction cups. Further, the vacuum source is a vacuum pump self-contained within the traction unit or is a vacuum distributor which receives vacuum from a hose connected to a source of vacuum remotely from the traction unit. Further, the vacuum source is a vacuum pump self contained in the traction unit powered by compressed air. Further, compressed air can come into each of the carriers equipped with a venturi vacuum generator.

The frame 101 is comprised of sections 10 and 11 that are hinged or otherwise flexibly connected to each other at connection points 12 as shown in FIGS. 1 and 2 with respect to one such connection. Frame sections 10 and 11 have angled or tapered ends 14 and 15, respectively to enable relative positioning between the frame section members without interference. The positioning of the frame members with respect to one another can be accomplished through suitable drive mechanisms, such as hydraulically actuated cylinders, driven pneumatically, 18, which are shown in the figure to be a pair of cylinders. When one cylinder contracts and the other cylinder expands, the frame section member 11 is able to move with respect to the position shown in dashed lines in FIG. 2 to be positioned at an angle with respect to frame section member 10. In this manner, the suction cup carrier 102 which moves along the frame 101 is positioned to turn the traction unit in one direction or another.

Figure 6:
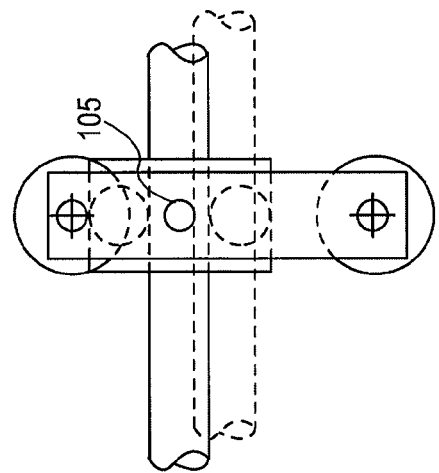
FIG. 6 is a view showing the displacement or direction change that is achieved by the adjustment in angle made between adjacent sections as shown in FIG. 5. support bracket moves with respect to the suction cups when the traction unit turns.
Figure 5:
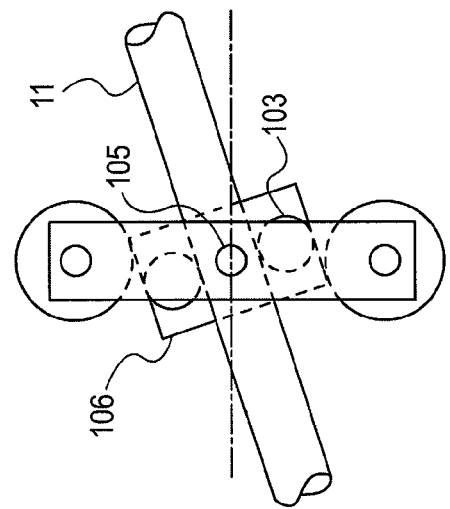
FIG. 5 is a view similar to FIG. 4 showing the section of one frame section pivoted to one side to show turning movement of the traction unit.
Figure 4:
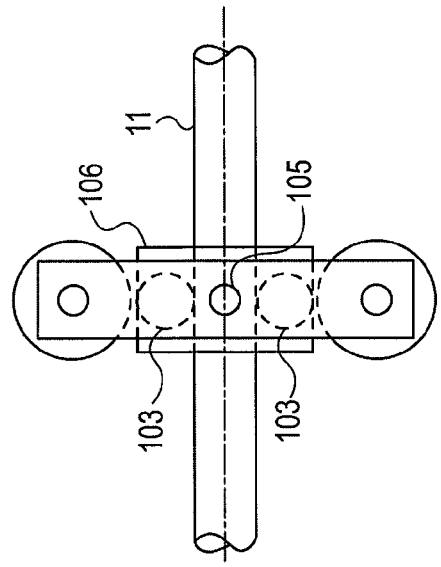
FIG. 4 is a schematic view of the positioning of the carrier with respect to the suction cups supported on a frame member with a traction unit of FIG. 1 traveling in a straight line direction.

FIGS. 4-6 show the adjustment made in the direction of movement of the traction unit schematically when positioning of a frame section 11 with respect to a frame section 10. In FIG. 4, frame section 11 is shown in a position shown by solid lines in FIG. 2. In FIG. 5, the frame section 11 is moved to the position shown by dashed lines in FIG. 2. As a result, the carrier 102, through the engagement of rollers 103 on the frame section member 11 of frame 101, changes its orientation such that forward movement along the frame section 11 results in displacement of the traction unit to a position shown in FIG. 6.

The movement of frame 11 not only turns but can move sideways from dotted line to solid line as shown in FIG. 6. This is accomplished by slotting the support bracket 102 to allow pin 105 to move and carry frame 11 to one side. This movement can be controlled by spring loading or cylinder (pneumatic or hydraulic). Another solution is a member can be connected by pin 105 then adjoined to ride in a slotted support bracket 102.

As shown in FIG. 3, a support bracket 106 supports the rollers 103 and is pivoted by a connection 105 which may be a pivot pin, threaded connector, rivet and the like, to carrier 102. The pivoted connection enables the support bracket 106 to pivot as shown in FIGS. 4-6, for example.

FIG. 7(a)-7(e) show the range of motion which the traction unit is able to move by making adjustments between the frame section members. Further, although only one connection between sections of frame 101 is shown in FIGS. 1 and 2, it is understood that frame 101 may comprise several sections including three or more sections, three of which are shown in FIGS. 7(a)-7(e).

Figure 7A:
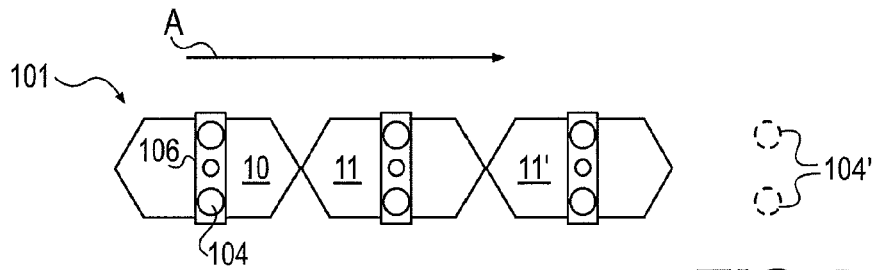
FIGS. 7(a)-7(e) show the position of the support bracket with respect to the suction cups during straight line movement and during positioning according to an embodiment of the invention.
Figure 7B:
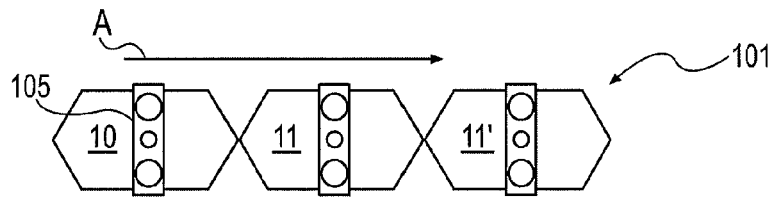

As shown in FIG. 7(a), the linked together sections 10, 11, 11' are able to shift with respect to one another with the resulting repositioning of the suction cups 104 carried by the carrier 102 as a result of the pivot pin 105 permitting relative movement between the support bracket 106 and the carrier 102.

Figure 7C:
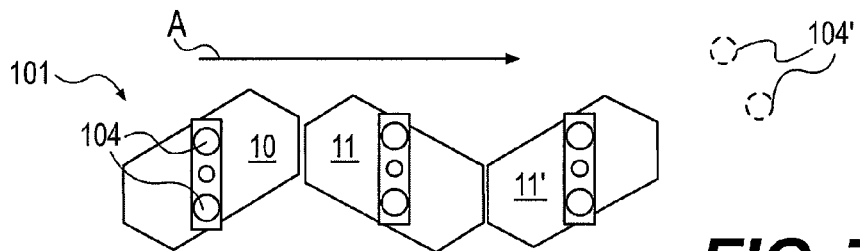
Figure 7D:
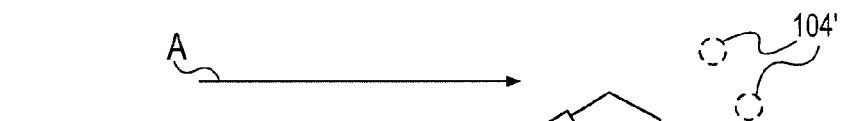
Figure 7E:
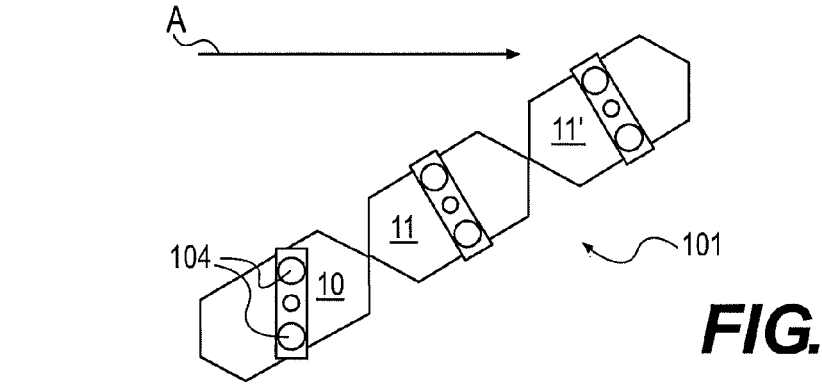

As shown, the positioning of the suction cups 104' is the same as FIG. 7(a) with respect to the initial position of suction cups 104 and is different in FIGS. 7(c) and 7(d) from the initial position of the suction cups. Accordingly, the articulation between the sections of the frame 101 enables movement of the traction unit as the traction unit traverses the work surface to a varying degree depending on the positioning of adjacent frame sections. FIG. 7(e) shows a result of an adjustment made between adjacent sections such that the traction unit proceeds at an angle shifted with respect to the direction of movement shown in FIG. 7(a) (arrow A in FIG. 7(a).

Figure 8:
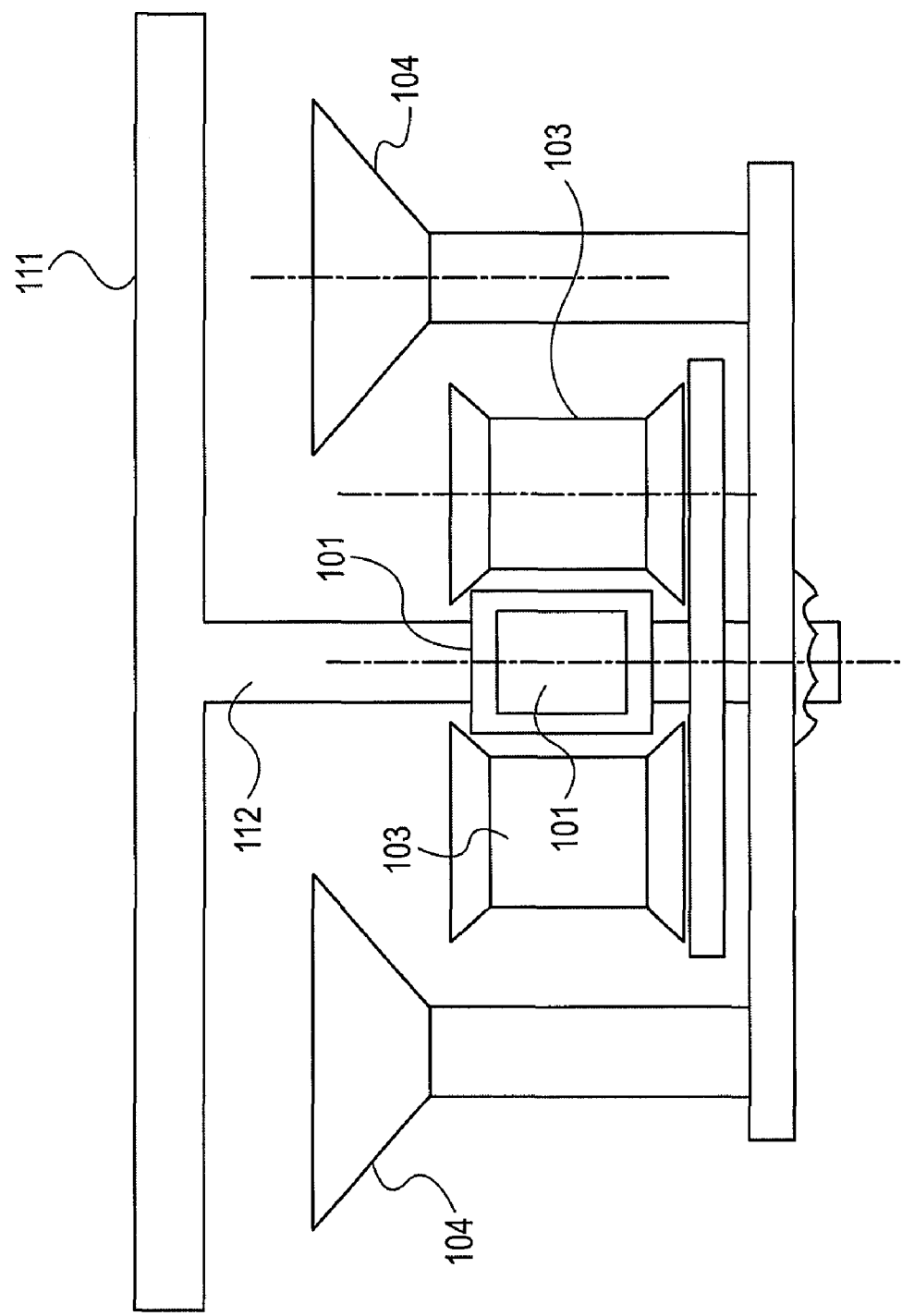
FIG. 8 shows a modification to the embodiment of the invention in which a platform supporting a work implement is attached to the frame for on a traction unit according to one embodiment of the invention.

FIG. 8 shows a detail of a support platform or base 111 for a working implement which is moved by the traction unit that is connected by a strut 112 to frame member 101. Support or base platform 111 enables the traction unit to move a device useful in working on surface WS to perform remotely controlled or self-controlled robotic operations such as grinding, sanding, paint removal, drilling, or non-destructive testing or painting on the surface of work, such as the skin of an aircraft. Further, for aircraft having a wing or a fuselage that extends in all directions vertical and horizontal and curved, the traction unit moves along these curved surfaces and provides a stable platform 111 on which work apparatus can be mounted for working on the work surface as the traction unit traverses the work surface. The platform is also suitable for the mounting of the control equipment that communicates remotely with the operator or that houses the microprocessor controller that operates and controls adjustments of the movements of the motor 107 and cylinders 18.

Figure 9:
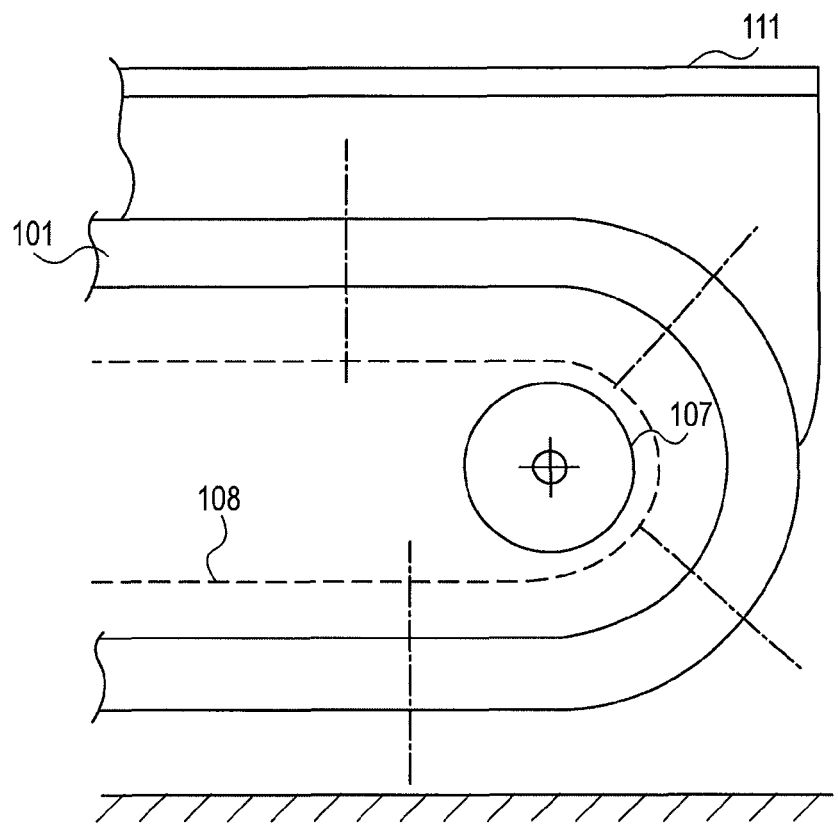
FIG. 9 shows another view of the base for a work implement as shown in FIG. 8.
Figure 10:
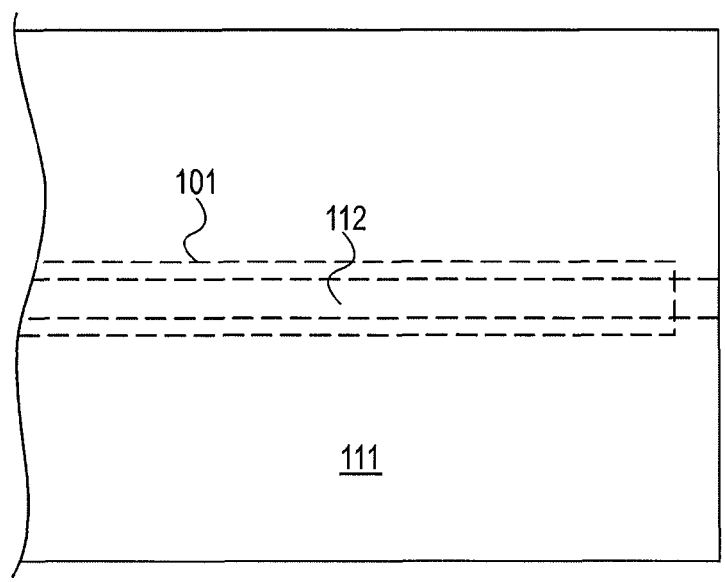
FIG. 10 shows a top view of the base for a work implement as shown in FIG. 8.

FIG. 9 shows the work platform or base 111 in side view mounted on a traction unit according to the embodiment of the invention shown in FIG. 1. FIG. 10 shows a top view of a portion of the work platform or base 111 shown in FIGS. 8 and 9.

Figure 11:
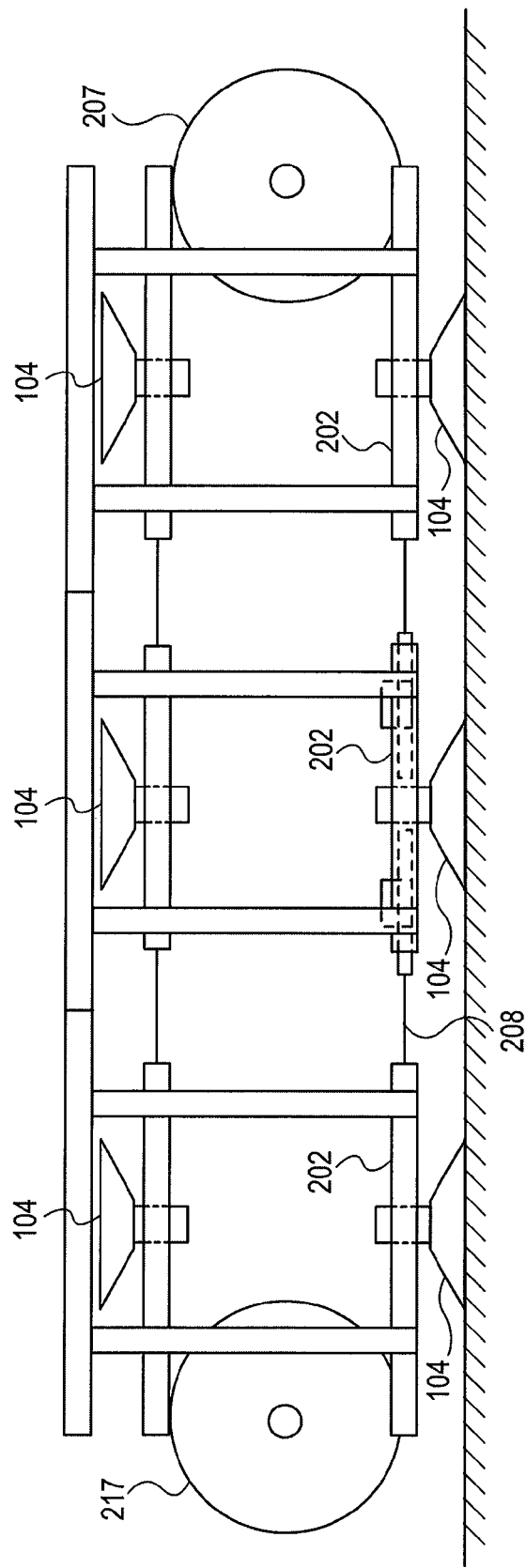
FIG. 11 shows a side view of another embodiment of the traction unit according to the invention.
Figure 12:
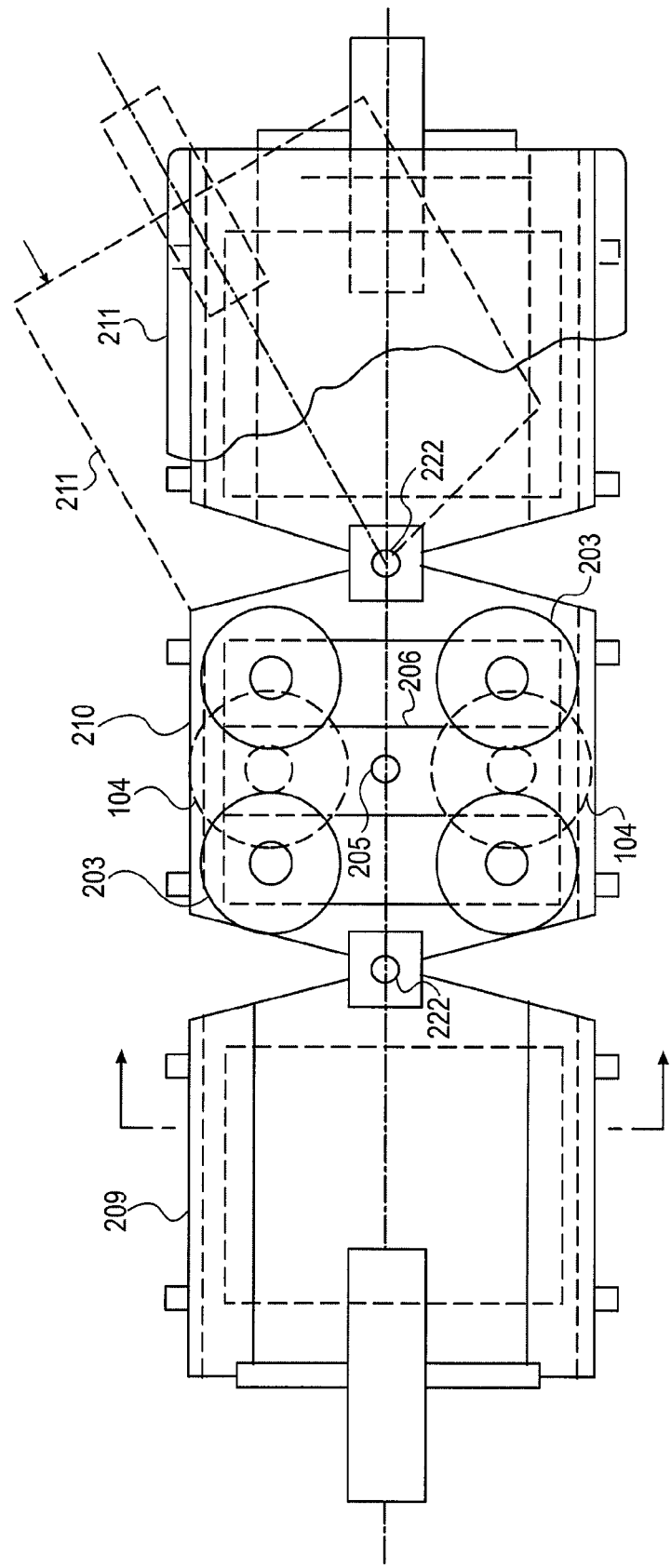
FIG. 12 shows a top view of the embodiment of the invention shown in FIG. 11.
Figure 14A:
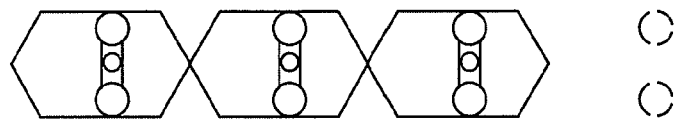
FIGS. 14(a)-14(e) show schematically the positioning of each section of a traction unit in straight line movement and in movement which turns from straight line movement.
Figure 14B:
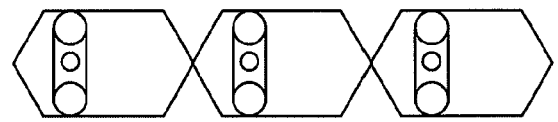
Figure 14C:
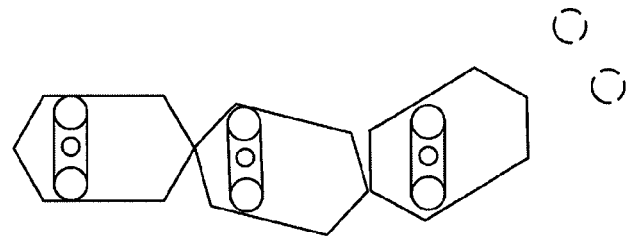
Figure 14D:
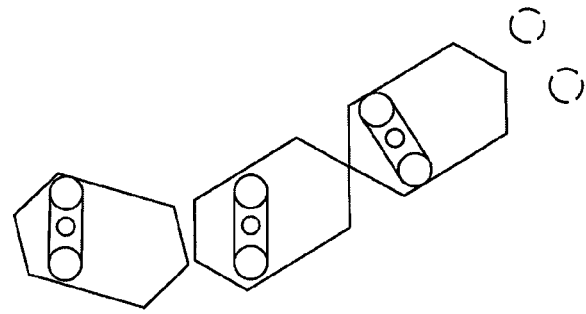
Figure 14E:
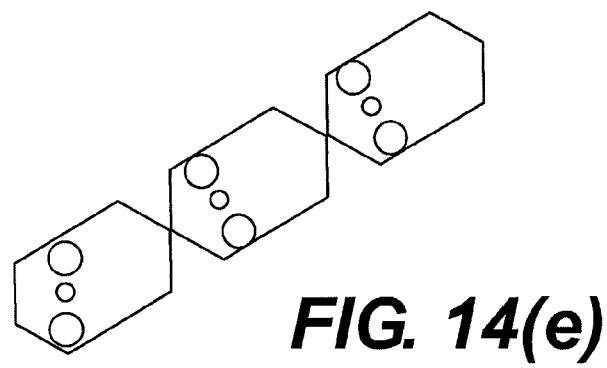

FIG. 11 shows a traction unit according to another embodiment of the present invention. The figure shows a traction unit having vacuum cups 104 mounted on carriers 202 that are connected together by a cable 208 driven by a motor through pulleys 207 and 217. As shown in FIG. 13, the traction unit has a platform or base 211 on which are mounted guide tracks or angle rails 231. The carriers 202 have rollers 203 that engage the angle rails 231 so that as the cable 208 pulls the carriers 202 around the rail tracks, the rollers engage the rails and advance the platform or base 211 with respect to the suction cups 204. As shown in FIG. 12, the sections 209, 210 and 211 of the traction unit are pinned together or pivotally connected to one another at 222 to permit articulated movement of adjacent sections 209, 210 and 211. In an arrangement similar to the first embodiment, a support bracket 206 is pinned to the carrier 202 by a pin or suitable pivoting connection 205 which allows for relative movement. As shown in FIG. 12, when the section 211 is shifted by a positioning device such as a hydraulic cylinder that is pneumatically operated, for example, (not shown) the section 211 is moved without shifting of the vacuum suction cups. Further, FIGS. 14(a)-14(e) show movement of the adjacent sections 209, 210 and 211 in a manner similar to that as shown in FIGS. 7(a)-7(e), and therefore further description of the figures is believed unnecessary.

While specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A traction unit comprising:
    a plurality of carriers;
    at least one suction cups connected to each carrier and supplied with vacuum from a vacuum source;
    a carrier support frame which supports the plurality of carriers, each of the plurality of carriers having rollers engaging said carrier support frame;
    one of a belt and a chain connecting said plurality of carriers for driving movement of the plurality of carriers around said carrier support frame, said one of said belt and chain being driven by a motor; and
    a plurality of carrier support frame sections forming said carrier support frame, adjacent ones of said plurality of carrier support frame sections being flexibly connected to one another for relative movement, said one of said belt and chain extending between said adjacent ones of said flexibly connected carrier support frame sections.

2. A traction unit according to claim 1,
    wherein said adjacent ones of said plurality of carrier support frame sections are pivotally connected to one another and movement of one such section with respect to an adjacent section changes a direction of movement of said traction unit by repositioning one said carrier with respect to said carrier support frame.

3. A traction unit according to claim 1,
    wherein said plurality of carriers are equally spaced along said carrier support frame and each of said carriers is pivotally connected to a support bracket on which said rollers are supported such that said rollers engage an outer periphery of said carrier support frame and traverse said carrier support frame while permitting relative movement between said support bracket and each said carrier when adjacent ones of said plurality of carrier support frame sections are adjusted for turning movement of said traction unit.

4. A traction unit according to claim 1
    wherein adjacent carrier support frame sections of said carrier support frame are adjusted by hydraulic cylinder.

5. A traction unit according to claim 1,
    wherein said traction unit is remotely operated by a control unit connected to said motor and connected to said hydraulic actuator for changing relative position between said carrier support frame sections of said carrier support frame.

6. A traction unit according to claim 1,
    wherein said traction unit is controlled independently by a program of a onboard microprocessor unit.

\* \* \* \* \*